(12) United States Patent
Ungerman

(10) Patent No.: US 8,063,991 B2
(45) Date of Patent: Nov. 22, 2011

(54) USING A REGION RESTRICTED CLEANUP SIGNAL TO BRIDGE A SIGNAL LEVEL MISMATCH BETWEEN A BLUE SCREEN AND AN ADJOINING GARBAGE MATTE

(75) Inventor: Ronald Ungerman, Saugus, CA (US)

(73) Assignee: Ultimatte Corporation, Chatsworth, CA (US)

( * ) Notice: Subject to any disclaimer, the term of this patent is extended or adjusted under 35 U.S.C. 154(b) by 1183 days.

(21) Appl. No.: 11/728,356

(22) Filed: Mar. 26, 2007

(65) Prior Publication Data

US 2008/0239150 A1    Oct. 2, 2008

(51) Int. Cl.
*H04N 9/64*    (2006.01)
*H04N 9/74*    (2006.01)

(52) U.S. Cl. .................... 348/587; 348/576; 348/589

(58) Field of Classification Search ............... 348/589, 348/576, 587
See application file for complete search history.

(56) References Cited

U.S. PATENT DOCUMENTS

| | | | | |
|---|---|---|---|---|
| 4,344,085 A * | 8/1982 | Vlahos | ............................ | 348/587 |
| 5,940,140 A * | 8/1999 | Dadourian et al. | ............ | 348/587 |
| 6,034,739 A * | 3/2000 | Rohlfing et al. | ............... | 348/586 |
| 6,101,289 A * | 8/2000 | Kellner | .......................... | 382/276 |
| 6,288,703 B1 * | 9/2001 | Berman et al. | ................. | 345/600 |
| 2003/0086018 A1 * | 5/2003 | Berman et al. | ................. | 348/584 |

* cited by examiner

*Primary Examiner* — Brian Yenke
(74) *Attorney, Agent, or Firm* — Blakely, Sokoloff, Taylor & Zafman

(57) ABSTRACT

A visible luminance step in a background scene, caused by a signal level mismatch between a matte signal level and a blue backing signal level, is significantly reduced by a soft edge transition region that raises the blue backing signal level up to the signal level of a garbage matte by using a cleanup signal restricted to the transition region. The soft edge formed by cleanup does not make subjects transparent, and actors may enter this zone with little loss of image quality.

14 Claims, 1 Drawing Sheet

USING A REGION RESTRICTED CLEANUP SIGNAL TO BRIDGE A SIGNAL LEVEL MISMATCH BETWEEN A BLUE SCREEN AND AN ADJOINING GARBAGE MATTE

BACKGROUND

A recent trend in the use of composite photography for motion pictures and television is the virtual studio that substitutes computer renderings in place of real sets.

A large curved blue backing permits actors to perform their scenes in front of this backing. The large blue backing permits a wide range of motion of the actors. As the camera follows the movements of an actor, any background scene in the computer must be moved in the opposite direction or the background scene will appear to be frozen to the image frame. Sensors on the camera dolly and camera provide the information needed by the computer to properly move the background scene image. Other methods use very small marks on the screen to provide camera moves to the computer.

Because of the similarity of the words "backing" and "background", the term "blue screen" is used to identify the plain colored backing behind the subjects during photography. The term "background scene" is used to describe the images that replace the blue screen. The selection of the blue screen is typically chosen because this color is easy to avoid in ones wardrobe. However if bright or deep blue is required in the wardrobe, one simply switches to a green screen.

There are many times when the camera image frame overshoots the blue screen and exposes part of the interior of the stage. An example of this overshoot is when the actor is required to appear to be at quite a distance. The camera is moved back from the actor and blue screen, and the lens is set to a shorter focal length. The actor now appears to be far away and is quite small in the image frame.

The image frame, being larger than the blue screen, exposes part of the stage ceiling, side walls and floor, plus all the garbage consisting of electrical cables, junction boxes, lamp stands, chairs, portable dressing rooms, people and miscellaneous other items such as a garbage can. A compositing device, such as the Ultimatte 11 available from Ultimatte Corporation, or equivalent computer, generates garbage mattes. Each of these mattes may be brought in from the edge of the image frame up to the edge of the blue screen, thus covering up all the garbage. When mattes are brought up to all four edges of the blue screen area they create a window frame, framing the blue screen. This is likely the origin of the term window and garbage matte. The term 'matte' herein refers to the garbage matte.

Matte areas are assigned a signal level of 1.0 to turn on the background scene to full level in the image area covered by the mattes. The blue screen also generates a control signal, Ec, where Ec=B−f(G,R), and R, G and B are red, blue and green signal levels and f(G,R) is a function of G and R such as the maximum of G and R. Its purpose is to turn on the background scene to full level within the un-obscured blue screen area, and to reduce the signal level of the background scene in proportion to the subject's opacity. Ec becomes zero for opaque subjects. The Ec signal level generated from the blue screen luminance is rarely sufficiently uniform to match the fixed 1.0 signal level of garbage mattes. A mismatch between these two signal levels of as little as one percent, where the matte joins the blue screen, is clearly visible in most background scenes.

The visibility of this mismatch is substantially reduced by softening, or feathering the garbage matte and extending it a short distance into the blue screen area. A soft edge in the form of an "S" shaped ramp links the two levels. The disadvantage of this practice is the fact that the background is turned on by the garbage matte whether a subject is present or absent. When a subject is present in this soft edge area, the background is still on and makes the subject transparent. The need for an actor to avoid this transition area reduces the useable blue screen area.

The invention described below is a method for reducing or eliminating the visibility of an edge mismatch between the blue screen and an adjoining matte, without introducing subject transparency, or reducing usable screen area.

SUMMARY

A visible luminance step in a background scene, caused by a signal level mismatch between a matte signal level and a blue backing signal level, is significantly reduced by a soft edge transition region that raises the blue backing signal level up to the signal level of a garbage matte by using a cleanup signal restricted to the transition region. The soft edge formed by cleanup does not make subjects transparent, and actors may enter this zone with little loss of image quality.

FIGURES

DETAILED DESCRIPTION

Figure 1:
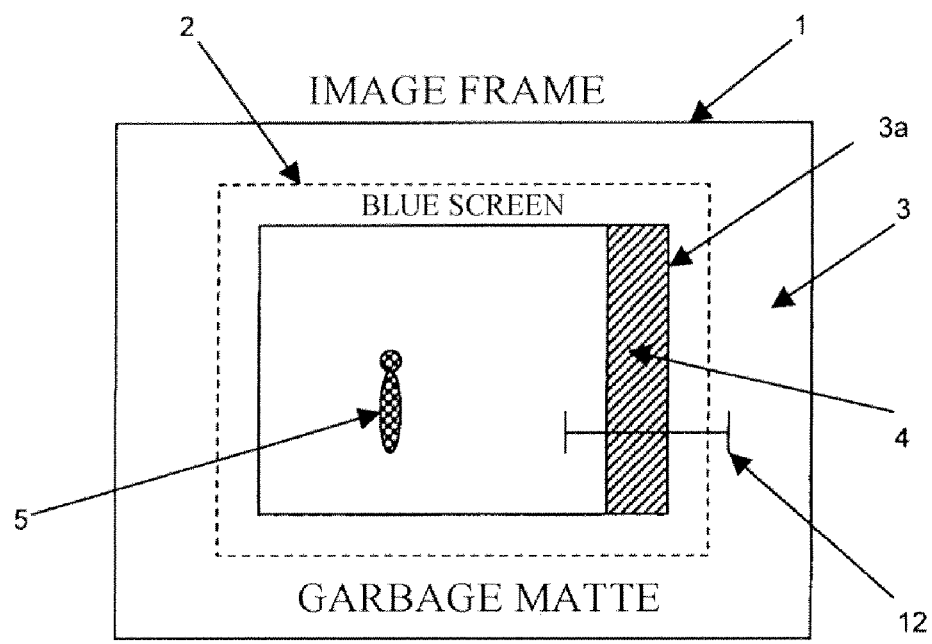
FIG. 1 illustrates an image frame that exceeds the dimensions of a blue screen on all four sides, with a garbage matte covering the space between the blue screen and image frame on all four sides.

FIG. 1 shows an image frame 1, where a foreground subject 5 is standing in the blue screen area 2, which area does not extend to the edges of the image frame. A garbage matte 3 covers the non-blue screen parts of the image frame plus an overlap into the blue screen represented by rectangle 3a, thus masking the view of the stage interior plus a portion of the blue screen. This overlap is necessary since it is usually not possible to precisely match each edge of the blue screen with each edge of the garbage matte. The shaded area 4 represents one side of a transition region between the blue screen 2 and the overlapping portion of the garbage matte 3.

Figure 2:
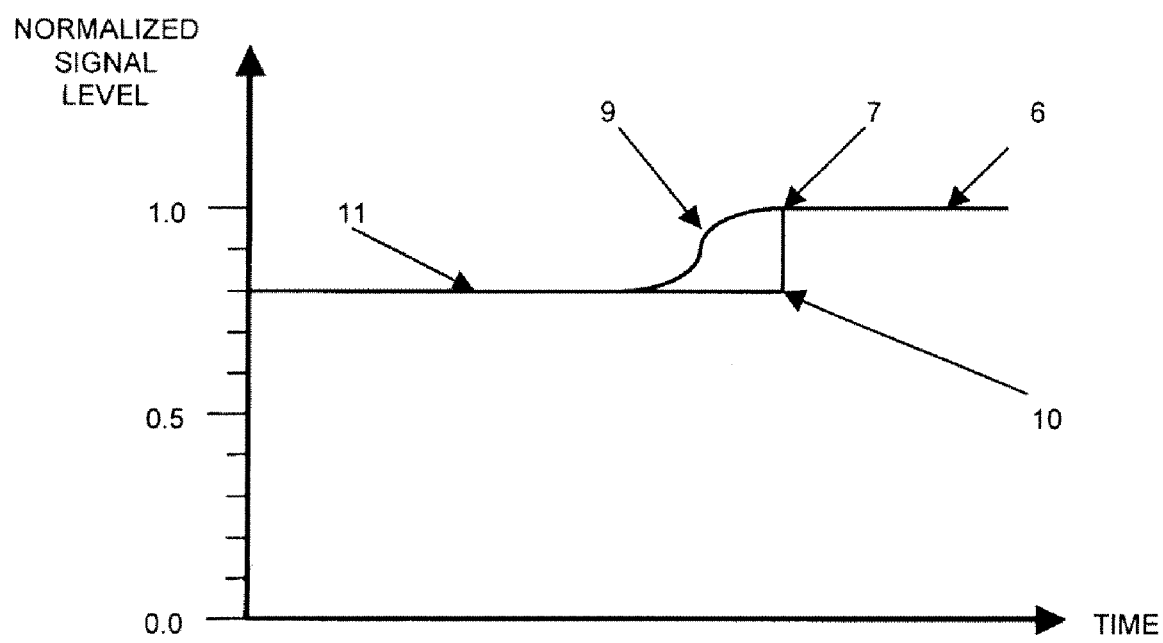
FIG. 2 illustrates a signal level mismatch between the signal level of a garbage matte and the signal level provided by the blue screen, and shows a transition region joining these two signal levels.

FIG. 2 represents the normalized signal levels at a section 12 of FIG. 1. Reference 6 represents a normalized signal level in the garbage matte 3. Reference 11 represents a normalized signal level in the blue screen area 2. Transition region 9 represents the normalized signal level in the transition region between the blue screen 2 and the garbage matte 3.

A nearly ideal solution to the signal level mismatch is the use of a restricted cleanup signal. Cleanup, as applied to composite images, is a means of removing image defects induced in the composite image by foot prints and dust on a blue floor, and fine wires that support moving objects in a scene, as well as improving uneven lighting on a blue screen.

U.S. Pat. No. 4,344,085 provides a detailed explanation of cleanup. In the prior art, cleanup is used for the whole image frame. Its use is balanced between background and foreground scenes to produce the best composite image. This cleanup signal cannot be used to correct for a substantial mismatch between a blue screen and a garbage matte without compromising the cleanup adjusted for removal of artifacts.

A second cleanup signal, restricted to the transition region 9, does not interfere with the first cleanup signal, and provides a smooth transition from the signal level 11 of the blue backing to the signal level 6 of the garbage matte.

The Ec control signal maintains a zero signal level for opaque subjects such as a person, on all areas of the blue screen, including the transition region 9. Opaque subjects therefore remain opaque when entering into transition region 9. Other than the loss of a few isolated hairs and a slight loss of shadow density, there is no penalty for using the restricted cleanup to raise the blue screen signal up to transition region 9.

There is no loss of effective screen area when using a restricted cleanup signal for correcting a blue screen to matte edge signal level mismatch. The procedure described above may be applied to all four window (garbage matte) edges. This garbage matte can be internally generated, or can be inputted as an external signal from another source, like a computer. The garbage matte can have any random form, and is not restricted to a rectangular form. The transition region can be internally generated, or could be part of an external matte signal. While an S shaped transition region is shown, one could use a flat ramp or other shapes. For equal effectiveness in removing the visibility of the transition region in the background scene, the S shaped transition region need extend a lesser distance into the blue screen area than other shapes, and is therefore preferred.

The transition region 9 should be as short as feasible and may be a simple ratio of length (number of pixels) and signal level mismatch illustrated by the step between reference 7 and reference 10 as shown in FIG. 2. This ratio is most critical when the background scene is bright, and much less critical when the background scene is a night scene. A proper ratio is readily set by observation before beginning a scene.

No attention has been paid to blue screen areas whose signal levels at the point of joining a garbage matte might be greater than that of the garbage matte. Such a problem does not exist because the blue screen control signal level, Ec, is limited to 1.0 by means of a clip.

Implementation

At any point where a blue screen joins a garbage matte, and the blue screen is at a lower level, the difference in signal levels defines the depth of the step between reference 7 and reference 10. This depth also determines the distance, in pixels, of the extension of the cleanup signal into the blue screen. The ratio of these two numbers can be selected as a function of the residual effect that can be accepted in the background scene.

A second cleanup signal is generated for adding signal level to the blue screen Ec signal level in the area of the S shaped transition region. The amount of cleanup signal to be added to the blue screen Ec signal is the difference between the signal level of Ec and the signal level defined by the signal level contour of the transition region.

Ec is known for every pixel in the blue screen area since it is the signal that turns on the background scene. The signal level of the garbage matte is a fixed 1.0. The addresses and signal levels of the S shaped transition region are a function of the depth of the mismatch step.

All of the functions such as the Ec control signal, garbage mattes, cleanup, and S shaped transition region feathering are known and have been in use for many years. The essence of this invention is to generate a second cleanup signal restricted to a transition region area, so as not to interfere with the cleanup signal covering the rest of the image frame. Because all of the individual functions described herein are well known in the field of image compositing, additional instruction is not required.

I claim:

1. A method for reducing the visibility of a signal difference between a blue screen and a garbage matte in the background scene of a composite image when the blue screen signal, Ec, is less than the signal level of an adjoining garbage matte and said visibility reduction does not cause a subject to become semitransparent when closely approaching an edge of the garbage matte; said method comprised of:
    a) generating a transition region from the edge of said garbage matte joining a blue screen where said transition region extends a predetermined distance over said blue screen,
    b) identifying a signal level for each pixel forming a contour of said transition region,
    c) generating a cleanup signal that raises the level of the Ec control signal up to the signal level of each pixel defining said transition region, thereby providing a soft edge transition from the blue screen to the garbage matte edge.

2. The method of claim 1 in which said transition region is S shaped.

3. The method of claim 1 in which said transition region is internally generated.

4. The method of claim 1 in which said transition region is part of an external garbage matte.

5. The method of claim 1 in which the distance of said transition region extends onto said blue screen is proportional to the difference of signal levels where the blue screen joins a garbage matte.

6. The method of claim 1 in which said transition region is shaped to minimize the effect on a background scene of a blue screen to matte signal level mismatch.

7. The method of claim 1 in which said clean up signal is restricted to said transition region of said blue screen and said garbage matte.

8. A method for reducing the visibility of a signal difference between a blue screen and a garbage matte in the background scene of a composite image when a blue screen control signal, Ec, is less than a signal level of an adjoining garbage matte and said visibility reduction does not cause a subject to become semi-transparent when closely approaching an edge of the garbage matte; said method comprising:
    a) defining a transition region of said garbage matte,
    b) adjusting a level of a clean up signal in proportion to a level of each pixel defining said transition region, thereby providing a gradual transition from the level of the Ec control signal, generated from the blue screen, and the garbage matte edge, without affecting the remainder of the image.

9. The method of claim 8 in which said transition region is S shaped.

10. The method of claim 8 in which said transition region is internally generated.

11. The method of claim 8 in which said transition region is part of an external garbage matte.

12. The method of claim 8 in which the distance of said transition region extends onto said blue screen is proportional to the difference of signal levels where the blue screen joins a garbage matte.

13. The method of claim 8 in which said transition region is shaped to minimize the effect on a background scene of a blue screen to matte signal level mismatch.

14. The method of claim 8 in which said clean up signal is restricted to said transition region of said blue screen and said garbage matte.

* * * * *

UNITED STATES PATENT AND TRADEMARK OFFICE
CERTIFICATE OF CORRECTION

PATENT NO. : 8,063,991 B2  Page 1 of 1
APPLICATION NO. : 11/728356
DATED : November 22, 2011
INVENTOR(S) : Ronald Ungerman It is certified that error appears in the above-identified patent and that said Letters Patent is hereby corrected as shown below:

In the Claims, Column 4, Claim 1, lines 4-5, please delete "blue screen signal" and insert -- blue screen control signal --.

Signed and Sealed this
Thirtieth Day of October, 2012

David J. Kappos
*Director of the United States Patent and Trademark Office*